(12) United States Patent
Cignarale et al.

(10) Patent No.: US 11,506,852 B2
(45) Date of Patent: Nov. 22, 2022

(54) FIBER PISTONING SOLUTION

(71) Applicant: AFL Telecommunications LLC, Duncan, SC (US)

(72) Inventors: Joseph Cignarale, Greer, SC (US); Chris Donaldson, Greenville, SC (US); Austin Farmer, Greer, SC (US); Ted Lichoulas, Simpsonville, SC (US); David Reeve, Taylors, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 17/215,875

(22) Filed: Mar. 29, 2021

(65) Prior Publication Data

US 2021/0311274 A1 Oct. 7, 2021

Related U.S. Application Data

(60) Provisional application No. 63/003,637, filed on Apr. 1, 2020.

(51) Int. Cl.
*G02B 6/44* (2006.01)
(52) U.S. Cl.
CPC ........... *G02B 6/443* (2013.01); *G02B 6/4494* (2013.01)

(58) Field of Classification Search
CPC .................................................. G02B 6/4494
See application file for complete search history.

(56) References Cited

U.S. PATENT DOCUMENTS

| 4,921,413 | A | * | 5/1990 | Blew | ..................... | B29C 48/156 |
| | | | | | | 425/114 |
| 4,923,274 | A | * | 5/1990 | Dean | .................... | G02B 6/3809 |
| | | | | | | 385/72 |
| 5,239,609 | A | * | 8/1993 | Auteri | .................... | G02B 6/444 |
| | | | | | | 385/136 |
| 8,913,864 | B2 | * | 12/2014 | Reeve | .................. | G02B 6/4467 |
| | | | | | | 385/109 |

* cited by examiner

*Primary Examiner* — Charlie Y Peng
(74) *Attorney, Agent, or Firm* — Dority & Manning, P.A.

(57) ABSTRACT

Fiber pistoning apparatus and methods of use are provided. A fiber anti-pistoning apparatus includes an axial centerline, and an elongate main body that at least partially surrounds the axial centerline and extends from a first end to a second end of the elongate main body. The elongate main body defines a channel that extends along the axial centerline for housing a bundle of fibers. The channel extends between a first opening at the first end, a second opening at the second end, and a slotted opening between the first end and the second end for receiving the bundle of fibers. The elongate main body includes one or more retention features for coupling to a first buffer tube.

17 Claims, 10 Drawing Sheets

FIBER PISTONING SOLUTION

PRIORITY STATEMENT

The present application claims priority to U.S. Provisional Patent Application Ser. No. 63/003,637, filed Apr. 1, 2020, which is incorporated by reference herein in its entirety.

FIELD

The present disclosure relates generally to fiber anti-pistoning apparatus, such as for reducing or eliminating fiber optic cable pistoning issues.

BACKGROUND

Historically, outside plant loose tube cables have been filled with water-blocking gel. This gel protects the optical fibers inside the cable's buffer tubes and interstitial regions from water ingress that could potentially damage the optical fiber in the cable and compromise the cable's mechanical integrity. Although the gel is necessary to protect the fiber within the cable, the gel presents potential challenges when fibers are accessed within network elements.

Outside plant cables form the backbone of a telecommunications network, connecting various points within the network itself, these cables are most commonly integrated and connected within the network by splicing optical fibers together at various network elements, such as, fiber optic closures and enclosures, pedestals, terminals, and NIDS (network interface devices). Within these network elements, individual buffer tubes within the cable are accessed and run to splice trays. These buffer tubes are tied off (secured) at the edge of the splice tray, and the fibers exiting the buffer tube a routed within the splice tray for splicing.

During design outside plant temperature operating conditions, the temperature could vary from −40 C to 65 C. This temperature variation can cause the gel and the fiber within the buffer tubes to eject out into the splice trays. In most cases this condition does not cause any issues other than aesthetics. Under worst case conditions, the ejected gel and/or fiber could result in fiber macrobends that cause signal attenuation that would reduce the quality of service of the network. These issues are generally known as fiber pistoning. As a result of such fiber pistoning issues, network operators would then be compelled to reroute the optical fibers in the closure, incurring an unplanned maintenance expense.

Accordingly, methods and apparatus for reducing or eliminating fiber pistoning issues are desired in the art.

BRIEF DESCRIPTION

Aspects and advantages of the invention will be set forth in part in the following description, or may be obvious from the description, or may be learned through practice of the invention.

In accordance with one embodiment, a fiber anti-pistoning apparatus is provided. The fiber anti-pistoning apparatus includes an axial centerline, and an elongate main body that at least partially surrounds the axial centerline and extends from a first end to a second end of the elongate main body. The elongate main body defines a channel that extends along the axial centerline for housing a bundle of fibers. The channel extends between a first opening at the first end, a second opening at the second end, and a slotted opening between the first end and the second end for receiving the bundle of fibers. The elongate main body includes one or more retention features for coupling to a first buffer tube.

In accordance with another embodiment, a method of using a fiber anti-pistoning apparatus is provided. The fiber anti-pistoning apparatus includes an axial centerline and an elongate main body at least partially surrounding the axial centerline. The elongate main body defines a channel that extends from a first end to a second end. The method includes a step of receiving a bundle of fibers into the channel via a slotted opening defined by the elongate main body. The slotted opening extends from the first end to the second end of the elongate main body. The method further includes a step of coupling a buffer tube to the fiber anti-pistoning apparatus via one or more retention features at one of the first end or the second end of the elongate main body. The bundle of fibers extending from within the buffer tube to within the channel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The singular forms "a", "an", and "the" include plural references unless the context clearly dictates otherwise.

The terms "upstream" and "downstream" as used herein may refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
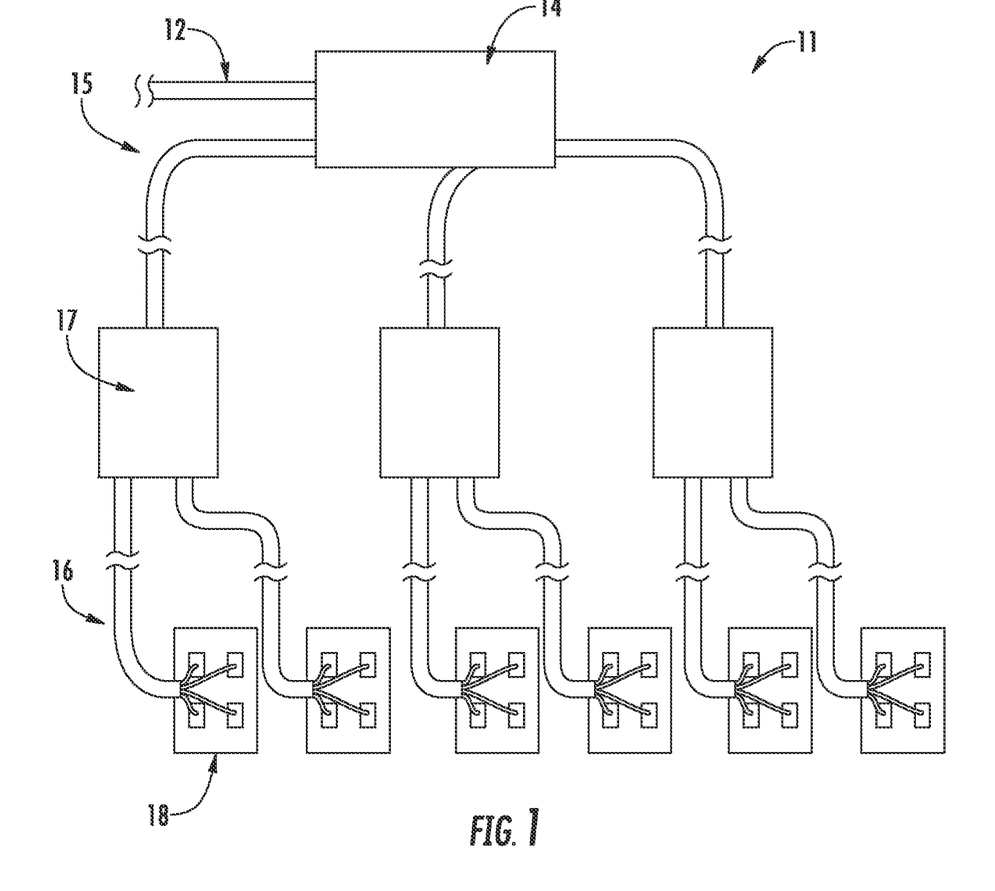
FIG. 1 is a schematic illustration of a fiber optics communications network, in accordance with embodiments of the present disclosure.

Referring now to FIG. 1, a portion of a fiber optic communications network 11 which includes a fiber optic distribution cable 12 is shown. One or more mid-span access locations are provided along the length of the distribution cable 12. The mid-span access location may be enclosed and protected from exposure to the environment by a conventional closure 14. The fiber optic communications network 11 may include a fiber optic distribution cable 12 having a plurality of mid-span access locations at branch points spaced along the length of the distribution cable, each providing access to at least one, and preferably, a plurality of optical fibers of the fiber optic network. Thus, in the embodiments shown, the distribution cable 12 may provide multiple locations for joining stub cables 15 of multi-port optical connection terminals 17 to the distribution cable 12 at each mid-span access location.

In the fiber optic network 11 as illustrated, pre-terminated optical fibers of the distribution cable 12 provided at the mid-span access location are routed out of the distribution cable and spliced to respective optical fibers of a stub cable 15 extending from a multi-port optical connection terminal 17. The optical fibers of the stub cable 15 may enter the closure 14 through a suitable cable port provided through an exterior wall, for example an end wall, of the closure 14. The stub cable 15 includes at least one, and preferably a plurality of optical fibers disposed within a protective cable sheath. The stub cable 15 may, for example, be any known fiber optic cable which includes at least one optical fiber and having a fiber count equal to or greater than that of a cable 16, which may for example be a drop cable, to be connected to the multi-port optical connection terminal 17 and equal to or less than that of the distribution cable 12.

The stub cable 15 may extend from the closure 14 into a terminal 17. The optical fibers of the stub cable 15 within the terminal 27 may be connectorized. One or more connectorized cables 16 may be interconnected with the connectorized optical fibers of the stub cable 15, i.e. in terminal 17. The cables 16 may include at least one single mode or multimode optical fiber of any type optically connected to a single fiber or multi-fiber optical connector in a conventional manner. The other ends of the cables 16 are optically connected to respective optical fibers of the communications network within an outside plant connection terminal 18 at a delivery point, such as an outside plant network access point (NAP) closure, local convergence cabinet (LCC), terminal, pedestal or network interface device (NID). As shown, one or more stub cables 15 extends from the closure 14 to a terminal 17 positioned at a distance from the mid-span access location, such as a telephone pole, hand-hole, vault or pedestal (not shown) in the fiber optic network 11. Each cable 16 extends from a terminal 17 to an outside plant connection terminal 18 located at a delivery point such as a subscriber premises.

It should be understood that the present disclosure is not limited to the above-described embodiment of a fiber optic network 11, and rather that any suitable fiber optic network 11 is within the scope and spirit of the present disclosure.

Figure 2:
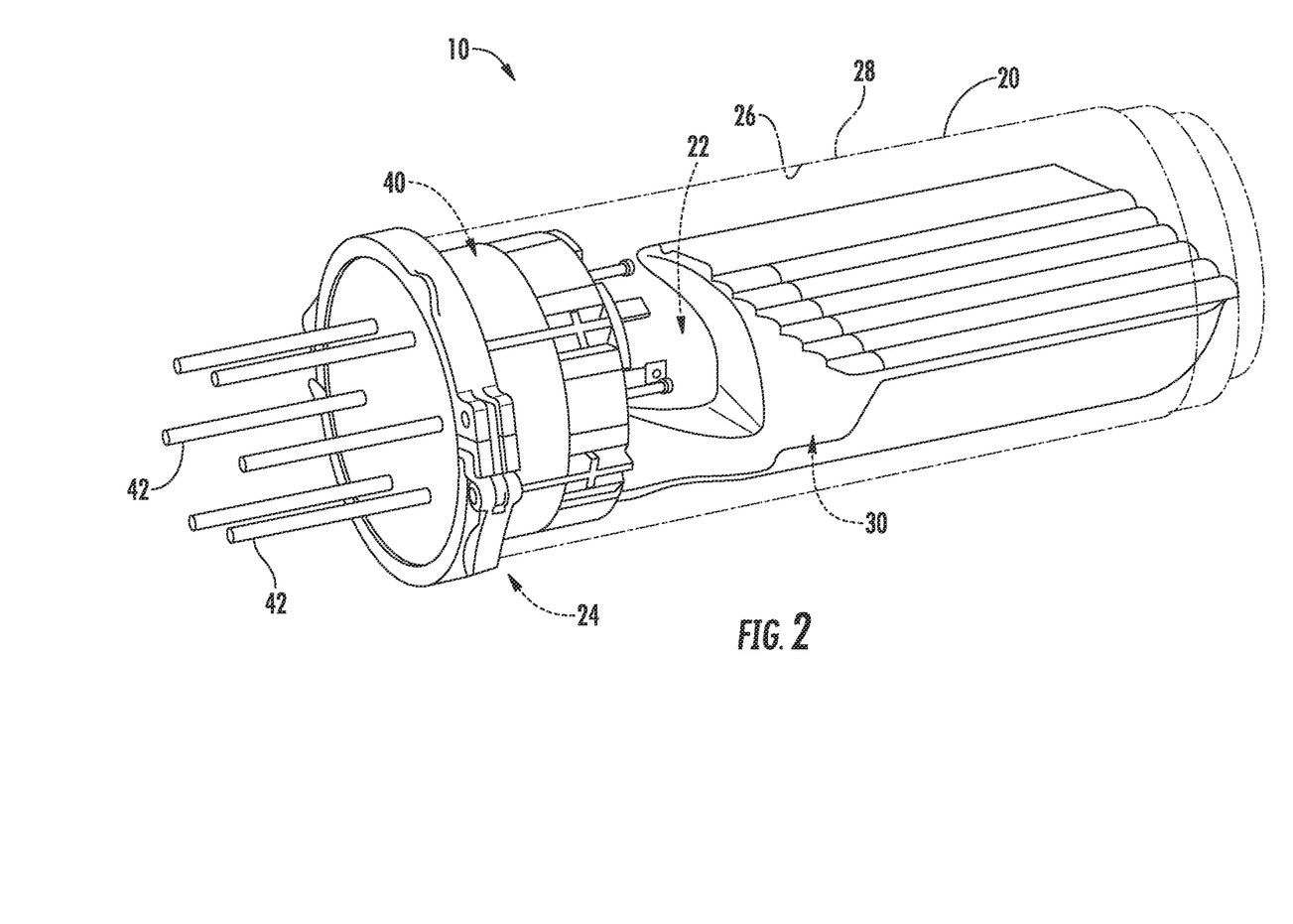
FIG. 2 is a perspective view of a closure, in accordance with embodiments of the present disclosure.
Figure 3:
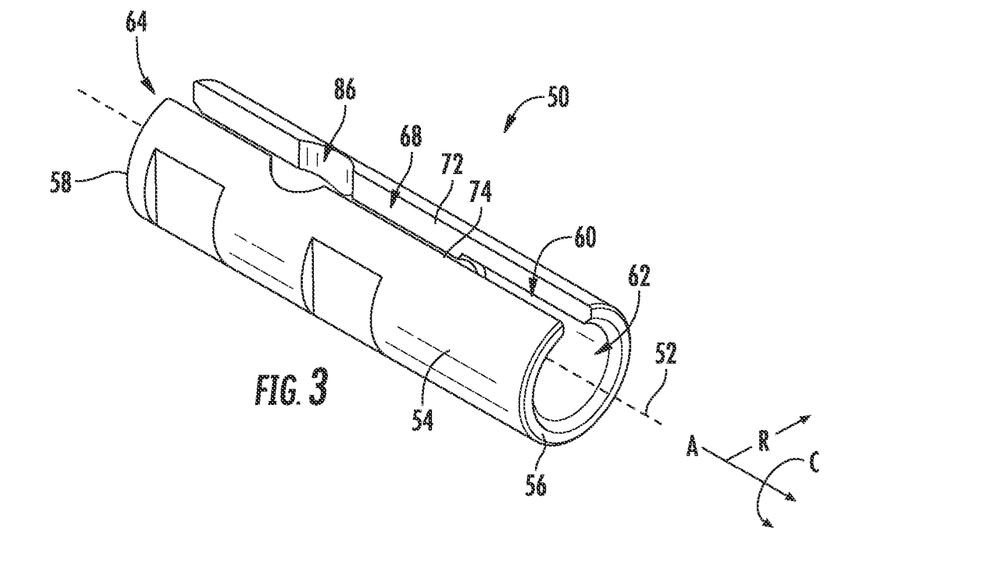
FIG. 3 is a perspective view of a fiber anti-pistoning apparatus, in accordance with embodiments of the present disclosure.
Figure 4:
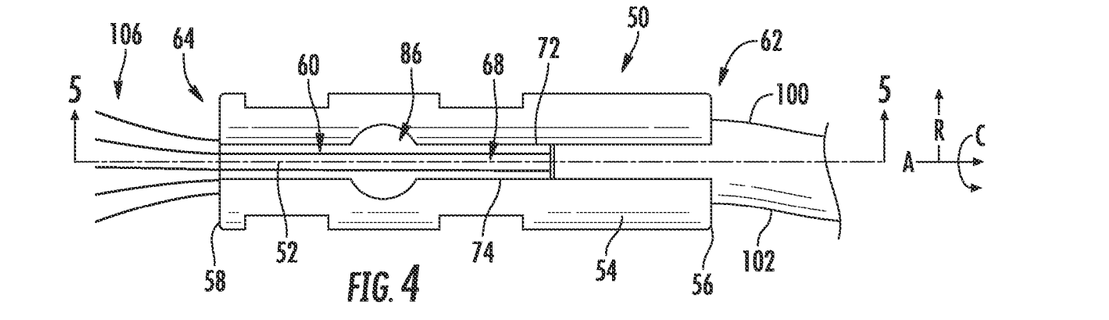
FIG. 4 is a top view of the fiber anti-pistoning apparatus shown in FIG. 3 attached to a fiber optic cable, in accordance with embodiments of the present disclosure.

FIG. 2 illustrates a closure 10 in which embodiments of the present fiber anti-pistoning apparatus may be used. As shown, the closure 10 includes a cover 20. Cover 20 is generally a domed cover which defines an interior 22 and an opening 24 which provides access to the interior 22. Cover 20 may include an inner surface 26 which defines the interior 22 and an opposing outer surface 28 which is exposed to the external environment.

An organizer assembly 30 may be insertable into (and thus disposed within) the interior 22, such as along a longitudinal axis of the closure 10. Organizer assembly 30 may include one or more organizer trays 200 and/or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22. In some embodiments, organizer assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22, such as in the organizer trays 200 of the organizer assembly 30.

It should be understood that the present disclosure is not limited the above-described embodiment of a closure 10, and rather any suitable closure, including for example a closure 14, terminal 17, cabinet, pedestal, NID, etc. is within the scope and spirit of the present disclosure. Particularly, it should be understood that the exemplary fiber anti-pistoning apparatus and methods as described herein may be utilized within any suitable closure, and the fiber anti-pistoning apparatus and methods described hereinbelow should not be limited to use within any particular closure unless specifically recited in the claims.

FIGS. 3 through 23 illustrate various embodiments of a fiber anti-pistoning apparatus 50 in accordance with the present disclosure. Although many embodiments of the fiber anti-pistoning apparatus 50 are shown and described herein, it should be appreciated that features illustrated or described as part of one embodiment can be used with another embodiment to yield a still further embodiment. Thus, it is intended that the present invention covers such modifications and variations as come within the scope of the appended claims and their equivalents In exemplary implementations, the fiber anti-pistoning apparatus 50 may couple to one or more fiber optic cables (such as the fiber optic cable 100). The fiber optic cable 100 may include a buffer tube that protects, surrounds, and generally insulates a bundle of optical fibers 106. In many implementations, a section of the buffer tube may be removed from the fiber optic cable 100, thereby exposing the bundle of optical fibers 106 (e.g. the bundle of optical fibers 106 may extend outwardly from an aft end of the buffer tube 102. Once a section of the buffer tube 102 has been removed, the bundle of optical fibers 106 may be inserted into the fiber anti-pistoning apparatus 50, and an aft end 104 of the first buffer tube 102 may couple to the fiber anti-pistoning apparatus 50. In this way, the bundle of optical fibers 106 may extend outwardly from the aft end 104 of the first buffer tube 102 directly into the fiber anti-pistoning apparatus, such that the bundle of optical fibers 106 may be partially housed by the fiber anti-pistoning apparatus 50. Advantageously, the fiber anti-pistoning apparatus (such as the fiber anti-pistoning apparatus 50) may function to prevent optical fibers from moving and/or pulling within a buffer tube, which could otherwise cause optical and/or mechanical losses on the optical fibers.

In the embodiments shown in FIGS. 3 through 23, the fiber anti-pistoning apparatus 50 may define an axial centerline 52, along which the fiber anti-pistoning apparatus 50 may extend. Further, the fiber anti-pistoning apparatus 50 may define a cylindrical coordinate system. The cylindrical coordinate system may define an axial direction A substantially parallel to and/or along the axial centerline 52 of the fiber anti-pistoning apparatus 50, a radial direction R perpendicular to the axial centerline 52, and a circumferential direction C extending around the axial centerline 52.

In many embodiments, the fiber anti-pistoning apparatus 50 may include an elongate main body 54 that at least partially surrounds the axial centerline 52. For example, the elongate main body 54 may be generally cylindrically shaped in some embodiments. In other embodiments, the elongate main body 54 may include one or more cylindrically shaped portions (e.g. having circular cross-sectional shape), in order to receive and retain an of a buffer tube. For example, the elongate main body 54 of the fiber anti-pistoning apparatus 50 may extend between a first end 56 and a second end 58. In particular, the elongate main body 54 may extend generally axially from the first end 56 to the second end 58 (e.g. along the axial centerline 52). In exemplary embodiments, the elongate main body 54 may define a channel 60 that extends along the axial centerline 52 for housing a bundle of fibers (which may extend outwardly from an aft end of the buffer tube).

In many embodiments, the channel 60 may extend between a first opening 62 at the first end 56, a second opening 64 at the second end 58, and a slotted opening 68 that extends between the first end 56 and the second end 58 for receiving the bundle of fibers into the channel 60. In some embodiments, the first opening 62 and the second opening 64 may each face the axial centerline (e.g be generally perpendicular to the axial centerline 52) and may each be generally circularly shaped. In many implementations, the slotted opening 68 may function to receive the bundle of fibers 106 into the channel 60, which houses the bundle of fibers 106 within the elongate main body 54 of the fiber anti-pistoning apparatus 50. In particular, the slotted opening 68 may extend along the entire axial length of the fiber anti-pistoning apparatus 50, e.g. from the first end 56 to the second end 58, and may be sized to receive the bundle of fibers 106 into the channel 60.

In many embodiments, such as the embodiments shown in FIGS. 3 through 23, the elongate main body 54 of the fiber anti-pistoning apparatus 50 may define side walls 72, 74 that are generally parallel to one another. In particular, the side walls 72 and 74 may co-extend generally axially with one another, such that the slotted opening 68 is defined between the side walls 72 and 74. Each of the side walls 72, 74 may be generally flat walls, which extend both axially and radially, and which co-extend generally parallel to one another in the axial direction. In particular embodiments, the side walls 72 and 74 may be circumferentially spaced apart from one another, such that the slotted opening 68 is defined circumferentially between the side walls 72 and 74.

In various embodiments, the elongate main body 54 may not entirely surround the axial centerline 52. For example, the elongate main body 54 may extend circumferentially around the axial centerline 52 from the side wall 72 to the side wall 74, such that the slotted opening 68 is defined between the side walls 72, 74. For example, in some embodiments, the slotted opening 68 may extend between about 90° and about 10° in the circumferential direction C between the walls 72 and 74 (as measured from the axial centerline 52). In other embodiments, the slotted opening 68 may extend between about 80° and about 10° in the circumferential direction C between the walls 72 and 74 (as measured from the axial centerline 52). In yet still further embodiments, the slotted opening 68 may extend between about 50° and about 10° in the circumferential direction C between the walls 72 and 74 (as measured from the axial centerline 52). In particular embodiments, the slotted opening 68 may extend between about 30° and about 10° in the circumferential direction C between the walls 72 and 74 (as measured from the axial centerline 52).

Each embodiment of the fiber anti-pistoning apparatus 50 described herein may include one or more retention features 76 for coupling to a first buffer tube 102 of a fiber optic cable 100. In some embodiments, such as the embodiments shown in FIGS. 3-9, 12-18, and 21-23, the fiber anti-pistoning apparatus 50 only includes one retention feature 76 (e.g. on the first end 56 of the fiber anti-pistoning apparatus). In such embodiments, the first buffer tube 102 may couples to the first end 56 of the fiber anti-pistoning apparatus 50, and the bundle of fibers 106 may extend through the channel 60 and out of the second end 58 of the fiber anti-pistoning apparatus 50. Further, in such embodiments, each optical fiber in the bundle of optical fibers 106 may extend outwardly from the second end 58 of the fiber anti-pistoning apparatus 50 into one or more splice trays or organizer assemblies (such as the organizer assembly 30 shown in FIG. 2).

In other embodiments, such as the embodiments shown in FIGS. 10, 11, 19, and 20, the fiber anti-pistoning apparatus 50 may include two retention features 76, 77 (a first retention feature 76 at the first end 56 and a second retention feature 77 at the second end 58). In such embodiments, the first retention feature 76 may for couple to a first first buffer tube 102 at the first end 56, and the second retention feature 77 may couple to a second buffer tube 103 at the second end 58. Further, in such embodiments, the bundle of fibers may extend outwardly from the first first buffer tube 102, through the channel 60, into the second buffer tube 103.

Figure 5:
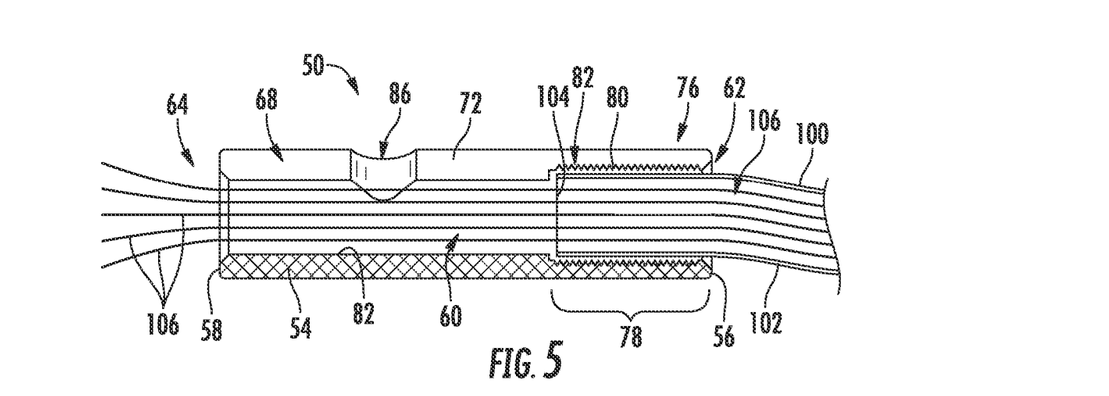
FIG. 5 is a cross-sectional side view of the fiber anti-pistoning apparatus shown in FIG. 4 from along the line 5-5, in accordance with embodiments of the present disclosure.
Figure 6:
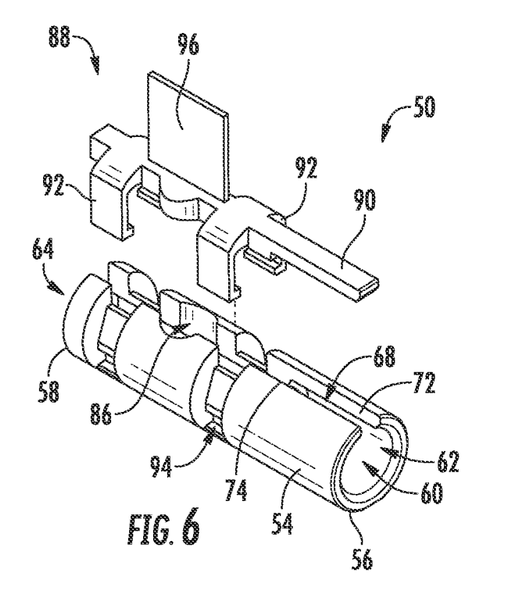
FIG. 6 is a perspective view of a fiber anti-pistoning apparatus having a lid, in accordance with embodiments of the present disclosure.
Figure 7:
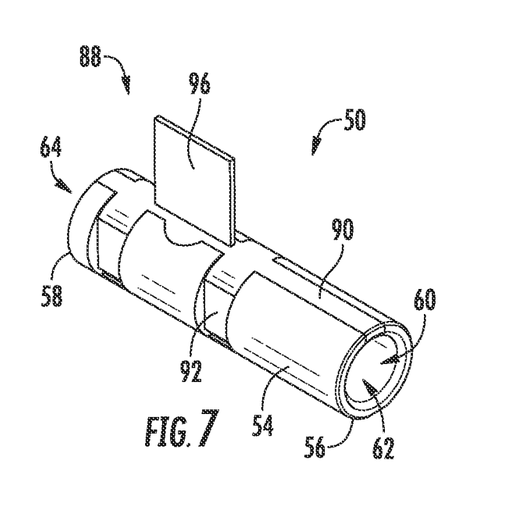
FIG. 7 is a perspective view of a fiber anti-pistoning apparatus having a lid, in accordance with embodiments of the present disclosure.
Figure 8:
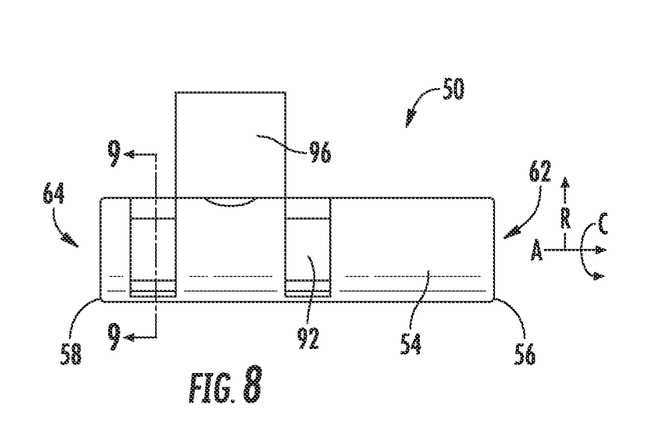
FIG. 8 is a side view of a fiber anti-pistoning apparatus having a lid, in accordance with embodiments of the present disclosure.
Figure 9:
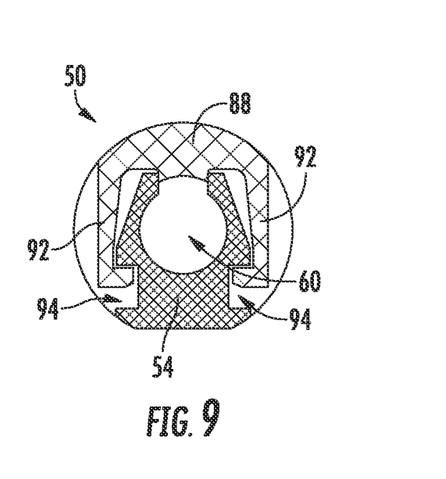
FIG. 9 is a cross-sectional view of a fiber anti-pistoning apparatus having a lid shown in FIG. 8 from along the line 9-9, in accordance with embodiments of the present disclosure.

As shown particularly in FIG. 5, the first retention feature 76 may include an inlet portion 78, which may be sized to receive an aft end 104 of the first buffer tube 102 of the fiber optic cable 100. For example, the inlet portion 78 may have a diameter of between about 0 inches and about 1 inch, such as between about 0 inches and about 0.5 inches, such as between about 0 inches and about 0.3 inches. In many embodiments, the inlet portion 78 may form a portion of the channel 60 and may extend axially from the first end 56 to a first annular wall 84. The first annular wall 84 may be generally perpendicular to the axial direction such that it contacts the aft end 104 of the first buffer tube 102 when inserted into the fiber anti-pistoning apparatus 50. In many embodiments, the inlet portion 78 may be sized to form an interference fit (or friction fit) with the exterior surface of the first buffer tube 102, such that the buffer tube may be interferingly coupled to the fiber anti-pistoning apparatus 50. In such embodiments, the inlet portion may define a diameter that is larger than the diameter of the channel 60.

In many embodiments, the one or more retention features 76 may include a first set of threads 80 defined on an interior surface 82 of the elongate main body 54 at the inlet portion 78 of the fiber anti-pistoning apparatus 50 for coupling to the first buffer tube 102. The first set of threads 80 may facilitate the coupling of the first buffer tube 102 to the fiber anti-pistoning apparatus, e.g., the threads 80 may allow the fiber anti-pistoning apparatus 50 to be threadably coupled to the first buffer tube 102. In many embodiments, the first set 80 of threads may be defined annularly within the inlet portion 78.

Figure 10:
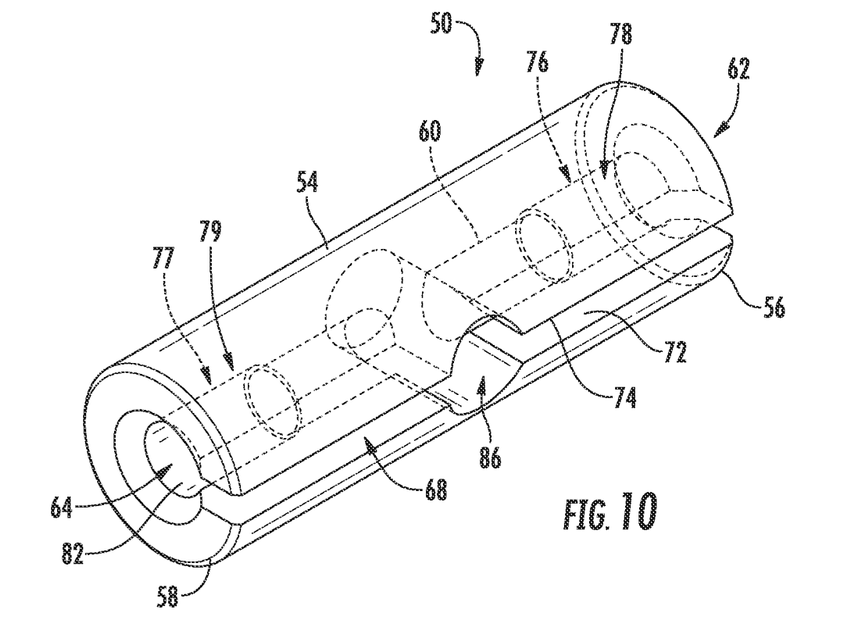
FIG. 10 is a perspective view of a fiber anti-pistoning apparatus, in accordance with embodiments of the present disclosure.
Figure 11:
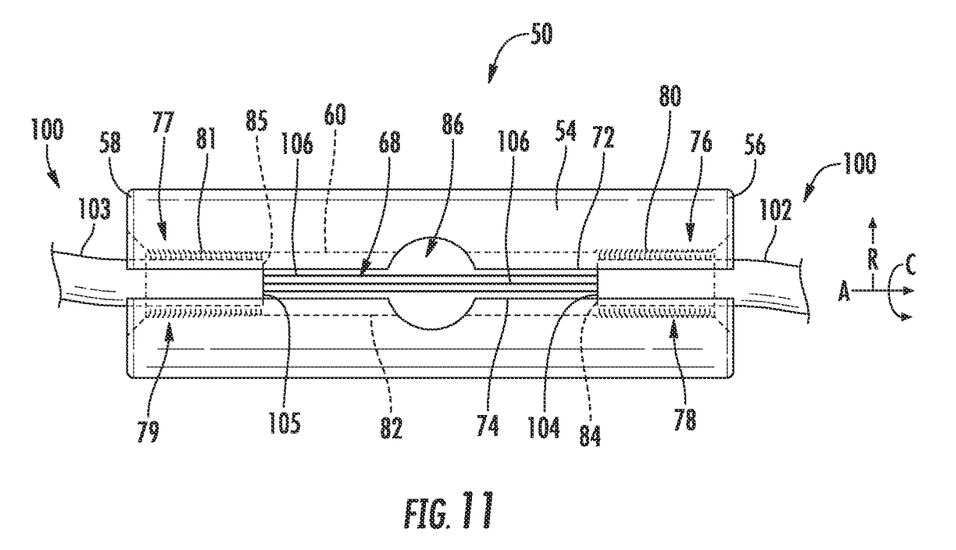
FIG. 11 is a top view of the fiber anti-pistoning apparatus shown in FIG. 10 attached to a fiber optic cable, in accordance with embodiments of the present disclosure.
Figure 12:
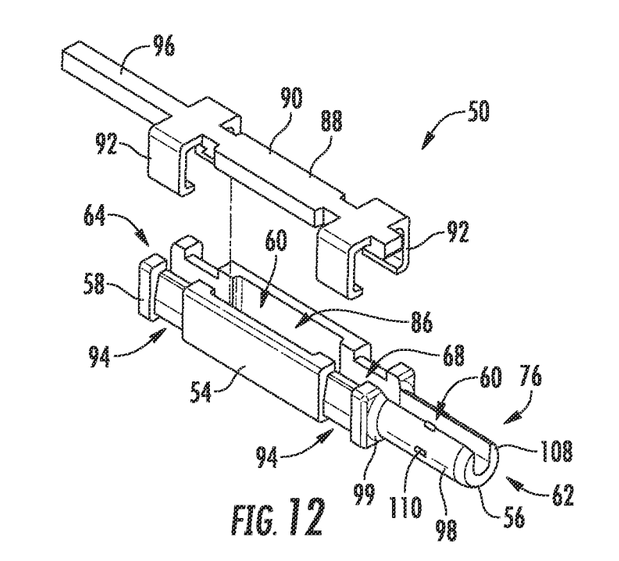
FIG. 12 is a perspective view of a fiber anti-pistoning apparatus, in accordance with embodiments of the present disclosure.
Figure 13:
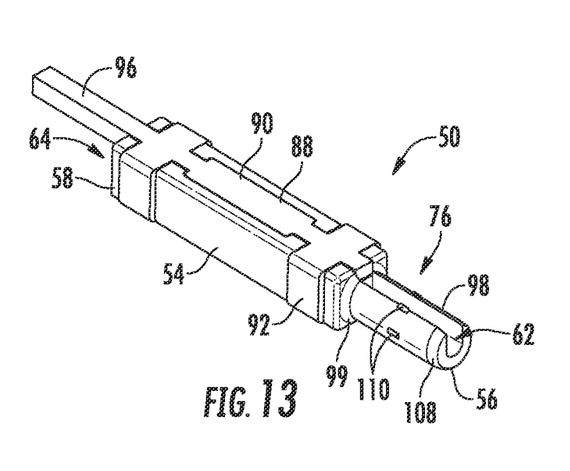
FIG. 13 is another perspective view of a fiber anti-pistoning apparatus shown in FIG. 12, in accordance with embodiments of the present disclosure.
Figure 14:
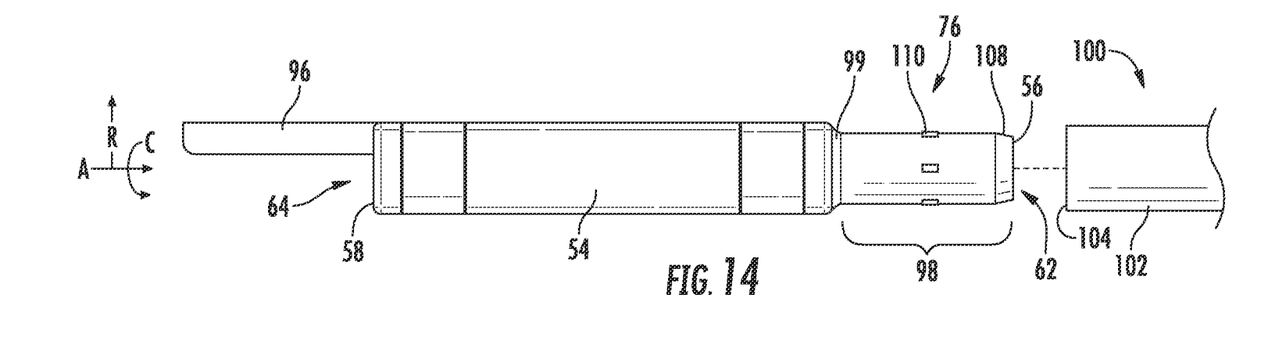
FIG. 14 is a side view of the fiber anti-pistoning apparatus shown in FIG. 13, in accordance with embodiments of the present disclosure.
Figures 15, 16:
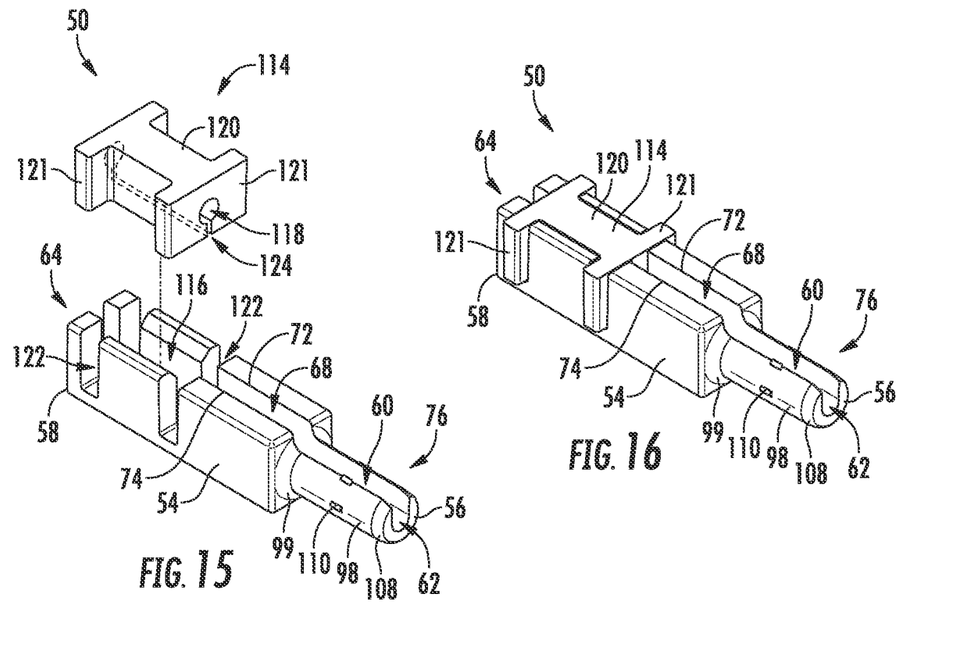
FIG. 15 is a perspective view of a fiber anti-pistoning apparatus, in accordance with embodiments of the present disclosure.
FIG. 16 is another perspective view of a fiber anti-pistoning apparatus shown in FIG. 15, in accordance with embodiments of the present disclosure.
Figure 17:
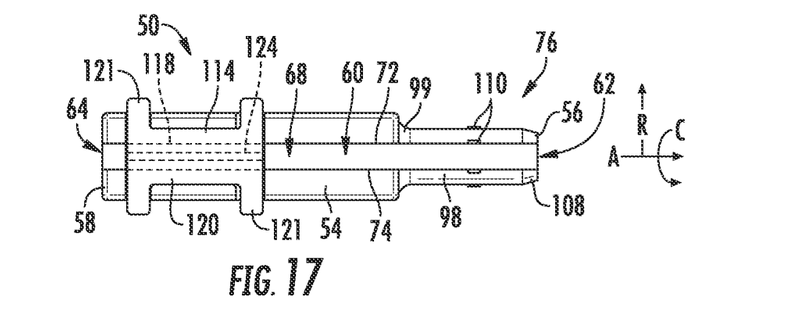
FIG. 17 is a top view of the fiber anti-pistoning apparatus shown in FIG. 16, in accordance with embodiments of the present disclosure.
Figure 18:
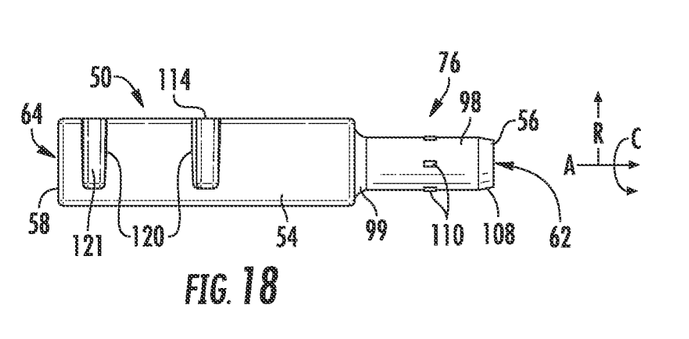
FIG. 18 is a side view of the fiber anti-pistoning apparatus shown in FIG. 16, in accordance with embodiments of the present disclosure.

In some embodiments, shown particularly in the embodiments of FIGS. 10 and 11, the fiber anti-pistoning apparatus may further include a second retention feature 77 disposed opposite the first retention feature 76. The second retention feature 77 may include an outlet portion 79, which may be sized to receive an aft end 105 of a second buffer tube 103 of the fiber optic cable 100. For example, the outlet portion 79 may have a diameter of between about 0 inches and about 1 inch, such as between about 0 inches and about 0.5 inches, such as between about 0 inches and about 0.3 inches. In many embodiments, the outlet portion 79 may form a portion of the channel 60 and may extend axially from the second end 58 to a second annular wall 85. The second annular wall 85 may be generally perpendicular to the axial direction A such that it contacts the aft end 105 of the buffer tube 103 when inserted into the fiber anti-pistoning apparatus 50. In many embodiments, the outlet portion 79 may be sized to form an interference fit (or friction fit) with the exterior surface of the second buffer tube 103, such that the second buffer tube may be interferingly coupled to the fiber anti-pistoning apparatus 50. In such embodiments, the outlet portion 79 may define a diameter that is larger than the diameter of the channel 60.

In such embodiments, the second retention feature 77 may include a second set of threads 81 defined on an interior surface 82 of the elongate main body 54 at the outlet portion 79 of the fiber anti-pistoning apparatus 50 for coupling to the second buffer tube 103. The second set of threads 81 may facilitate the coupling of the second first buffer tube 102 to the fiber anti-pistoning apparatus 50, e.g., the threads 81 may allow the fiber anti-pistoning apparatus 50 to be threadably coupled to the second buffer tube 103. In many embodiments, the second set 81 of threads may be defined annularly within the outlet portion 79.

In many embodiments, the elongate main body 54 of the fiber anti-pistoning apparatus 50 may further define an injection port 86 for receiving an adhesive into the channel 60. For example, the adhesive may be received (or injected) through the injection port 86 and into the channel 60 for surrounding the bundle of optical fibers 106 within the channel 60. In many embodiments, the injection port 86 may be defined by the elongate main body 54 between the first end 56 and the second end 58. In particular, the injection port 86 may be generally radially oriented and disposed along the slotted opening 68. The injection port 86 may be in fluid communication with both the slotted opening 68 and the channel 60 and may be sized to receive an adhesive injecting means (such as a needle and syringe). In many embodiments, the injection port may have a generally circular cross-sectional shape. In other embodiments, the injection port 86 may be generally rectangularly shape or any other suitable shape sized to receive an adhesive. For example, the diameter (or width in some embodiments) of the injection port may be between about 0.5 inches and about 0.1 inches, such as between about 0.4 inches and about 0.1 inches, such as between about 0.3 inches and about 0.1 inches. In many embodiments, the injection port 86 may have a larger circumferential width than the slotted opening 68. In some embodiments, the fiber anti-pistoning apparatus 50 may not include an injection port 86 whatsoever.

In some embodiments, such as the embodiments shown in FIGS. 6-9 and 12-14, the fiber anti-pistoning apparatus 50 may further include a lid 88 removably coupled to the elongate main body 54. The lid may couple directly to the exterior of the elongate main body 54. As shown, the lid 88 may extend within the slotted opening 68, such that the lid 88 and the elongate main body 54 collectively extend around the entire axial centerline 52 (e.g. 360 degrees around the axial centerline 52). In exemplary embodiments, the lid 88 may include a main body 90 and hook arms 92 extending form the main body 90. The main body 90 of the lid 88 may extend within the slotted opening 68. The hook arms 92 may extend into and couple to an exterior recess 94 in the elongate main body 54. In this way, the hook arms 92 of the lid 88 may snap into a coupling engagement with the exterior recess 94 by applying a radial force. In some embodiments, the lid 88 may include a handle 96 to facilitate the coupling of the lid 88 to the elongate main body 54.

In many embodiments shown and described herein, the fiber anti-pistoning apparatus 50 may include one or more retention features 76, 77 for coupling to an exterior surface (i.e. an exterior diameter) of a first buffer tube 102 of a fiber optic cable 100. In such embodiments, as described above, the first buffer tube 102 may be inserted into the fiber anti-pistoning apparatus 50, such that the interior surface of the elongate main body 54 grips or forms an interference (or friction) fit with the exterior surface of the first buffer tube 102. Alternatively or additionally, as shown in many embodiments, the fiber anti-pistoning apparatus 50 may include one or more retention features 76, 77 for coupling to the interior surface (i.e. an interior diameter) of a first buffer tube 102 of a fiber optic cable 100. In such embodiments, the elongate main body 54 may be inserted into the first buffer tube 102, such that an exterior surface of the elongate main body 54 forms an interference (or friction) fit with an interior surface of the first buffer tube 102.

For example, in some embodiments, such as the embodiments shown in FIGS. 12-18 and 21-23, the one or more retention features 76, 77 may include a nose portion 98 of the elongate main body 54, which may be inserted into the first buffer tube 102 of a fiber optic cable 100. The nose portion 98 may be a portion of the elongate main body 54 and may extend axially from a base 99 to the first end 56. The nose portion 98 be generally cylindrically shaped (or may be frustoconical in some embodiments), such that it defines a generally circular cross-section. In many embodiments, the nose portion 98 may include a slight taper or slant relative to the axial centerline 52, such that the nose portion may taper (or converge) radially inward from a base 99 of the nose portion 98 to the first end 56 of the elongate main body 54. In many embodiments, the nose portion 98 may include a tapered edge 108 at the end wall to facilitate insertion of the nose portion 98 into the first buffer tube 102 of a fiber optic cable. In exemplary embodiments, the nose portion 98 is sized to form an interference fit with an internal surface of the first buffer tube 102.

Although certain embodiments of the fiber anti-pistoning apparatus 50 include retention features for coupling to the exterior of a buffer tube, and others include retention features for coupling to the interior of a buffer tube, it should be understood that a further embodiment having both these retention features is possible and is within the scope and spirit of the present disclosure.

In particular embodiments, such as the embodiments shown in FIGS. 12 through 18 the nose portion 98 of the elongate main body may include ribs 110 circumferentially spaced apart from one another and extending radially outward from the nose portion 98. In many embodiments, the ribs 110 may be configured to grip the interior of the first buffer tube 102 of the fiber optic cable 100 to prevent the first buffer tube 102 from sliding or decoupling from the fiber anti-pistoning apparatus 50. In some embodiments, as shown, each of the ribs 110 may be at the same axial location as one another but may be circumferentially spaced apart (e.g. equally circumferentially spaced apart) for a uniform distribution of gripping pressure on the interior of the first buffer tube 102.

Figure 21:
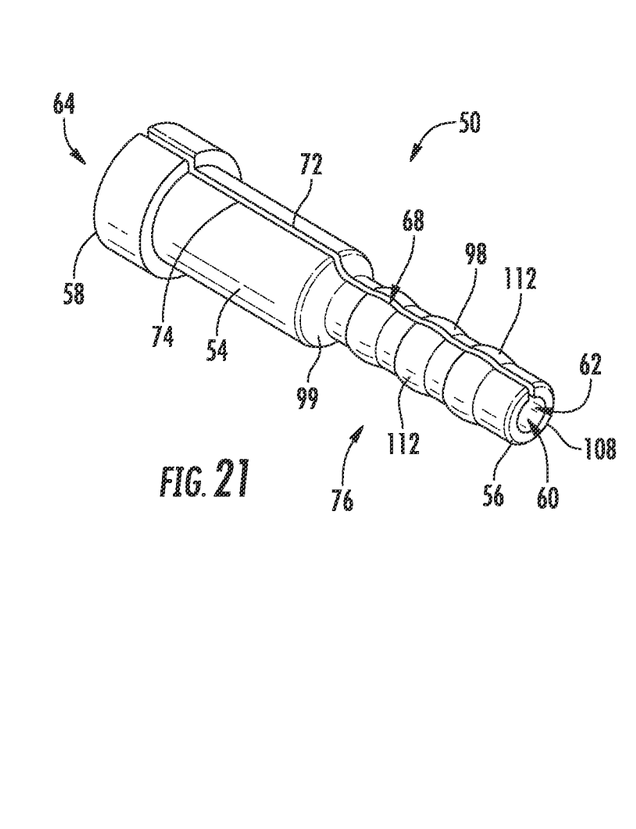
FIG. 21 is a perspective view of a fiber anti-pistoning apparatus, in accordance with embodiments of the present disclosure.
Figure 22:
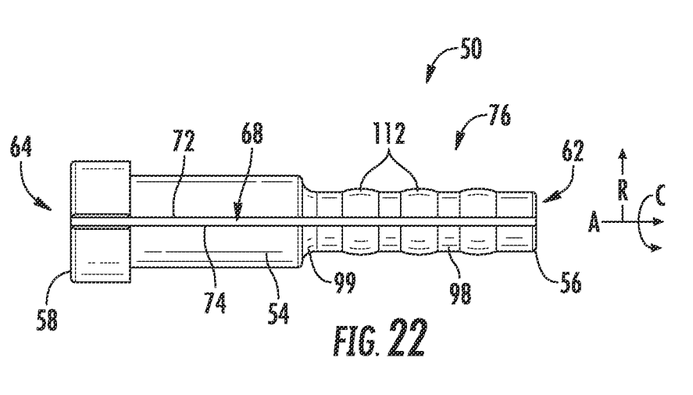
FIG. 22 is a top view of the fiber anti-pistoning apparatus shown in FIG. 21, in accordance with embodiments of the present disclosure.
Figure 23:
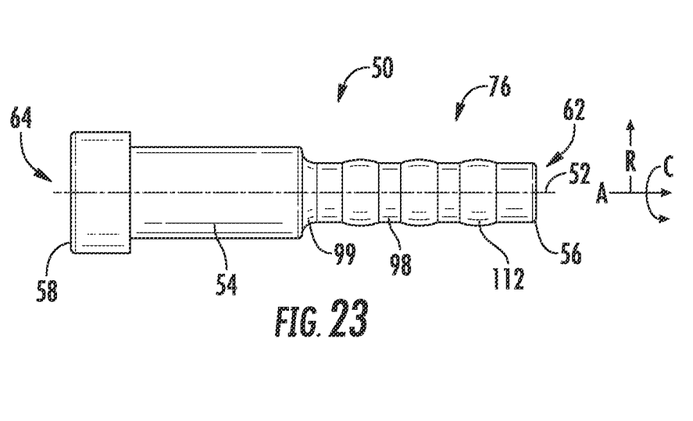
FIG. 23 is a side view of the fiber anti-pistoning apparatus shown in FIG. 21, in accordance with embodiments of the present disclosure.

In other embodiments, such as the embodiments shown in FIGS. 21-23, the nose portion 98 of the elongate main body 54 may include ribs 112 axially spaced apart from one another and extending radially outward from the nose portion 98. In many embodiments, the ribs 112 may be configured to grip the interior of the first buffer tube 102 of the fiber optic cable 100 to prevent the first buffer tube 102 from sliding or decoupling from the fiber anti-pistoning apparatus 50. In some embodiments, as shown, each of the ribs 110 axially spaced apart (e.g. equally axially spaced apart) for a uniform distribution of gripping pressure on the interior of the first buffer tube 102. In some embodiments, as shown, each of the ribs 112 may extend continuously circumferentially around the nose portion 98 of the elongate main body 54.

In various embodiments, such as the embodiments shown in FIGS. 15 through 18 the fiber anti-pistoning apparatus 50 may further include a grommet 114 that may couple to the elongate main body 54 between the first end 56 and the second end 58 of the elongate main body 54. For example, the elongate main body 54 may define a grommet opening 116 along the slotted opening 68 and the channel 60. The grommet opening 116 may correspond to the shape of the grommet 114, such that the grommet 114 may be slidingly received by the elongate main body 54 via the grommet opening 116. In this way, the grommet 114 may form an interference fit (or friction fit) with the elongate main body 54 when disposed within the grommet opening 116. In exemplary embodiments, the grommet 114 may define an axial passage 118, which may form a portion of the channel 60 when attached to the elongate main body 54. For example, the grommet 114 may be coupled to the elongate main body 54 between the first end 56 and the second end 58 of the elongate main body 54, such that the axial passage 118 aligns with the channel 60 and forms a portion of the channel 60.

In certain embodiments, the grommet 114 may include a main body 120 and one or more arms 121 that extend from the main body 120. For example, the one or more arms 121 may be received by one or more corresponding slots 122 (which may for a portion of the grommet opening 116) in the elongate main body 54. The axial passage 118 may be defined within the main body 120 of the grommet 114 and may extend along the axial centerline 52 when positioned within the elongate main body 54. Further, the grommet 114 may include an axial slot 124 on a first side of the main body 120. The axial slot 124 may be connected to the axial passage 118 of the grommet 114 and may have a smaller width than the axial passage 118 (e.g. in the circumferential direction C). In many embodiments, both the axial slot 124 and the axial passage 118 may extend along the entire axial length of the grommet 114. The axial slot 124 may function to receive a bundle of fibers (such as the bundle of fibers 106) into the axial passage 118 of the grommet 114. Subsequently, the grommet 114 may be slid into the grommet opening 116, while the bundle of fibers 106 are simultaneously received into the channel 60 by the slotted opening 60. In many embodiments, the grommet 114 may be slidably coupled to the elongate main body 54 with the axial slot 124 face down, such that the bundle of fibers may not escape the axial passage 118 of the grommet or the channel 60 of the elongate main body 54 during use of the fiber anti-pistoning apparatus 50.

Figure 19:
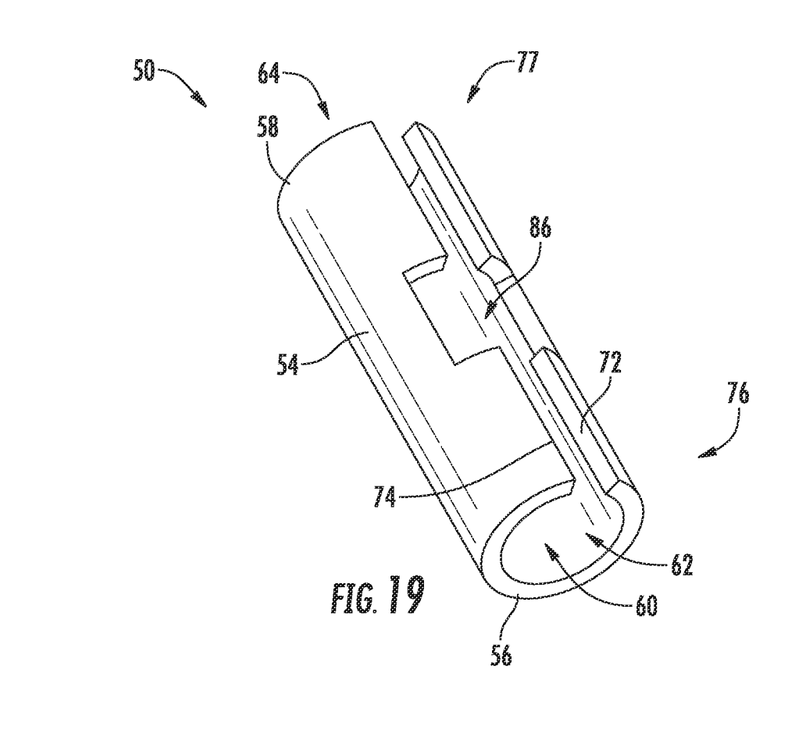
FIG. 19 is a perspective view of a fiber anti-pistoning apparatus, in accordance with embodiments of the present disclosure.
Figure 20:
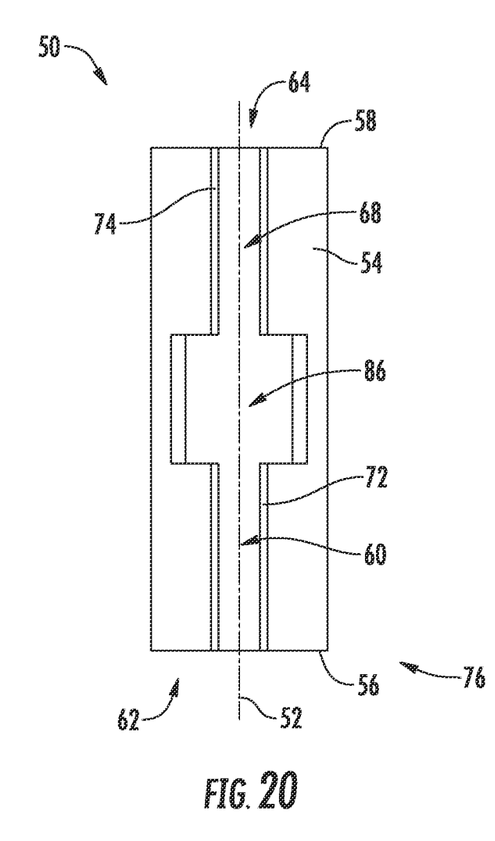
FIG. 20 is a top view of the fiber anti-pistoning apparatus shown in FIG. 19, in accordance with embodiments of the present disclosure.

In many embodiments, particularly in the embodiment shown in FIGS. 19 and 20, the fiber anti-pistoning apparatus 50 may be at least partially composed of a formable metal material (such as entirely formed from a formable metal material in some embodiments). As used herein, a formable metal material may be a metal that is capable of being plastically deformed by a user applied force. For example, in particular implementations, a bundle of fibers 106 may be received into the channel 60 through the slotted opening 68, and a portion of a first buffer tube 102 may be inserted into the channel 60. Subsequently, a user may apply a pinching force (or crimping force) to the exterior of the fiber anti-pistoning apparatus 50 to plastically deform the fiber anti-pistoning apparatus 50 and form an interference fit between the first buffer tube 102 and the fiber anti-pistoning apparatus 50. In some embodiments, the formable metal material may be, but is not limited to, aluminum, copper, brass, one or more steel alloys, or other suitable material.

Figure 24:
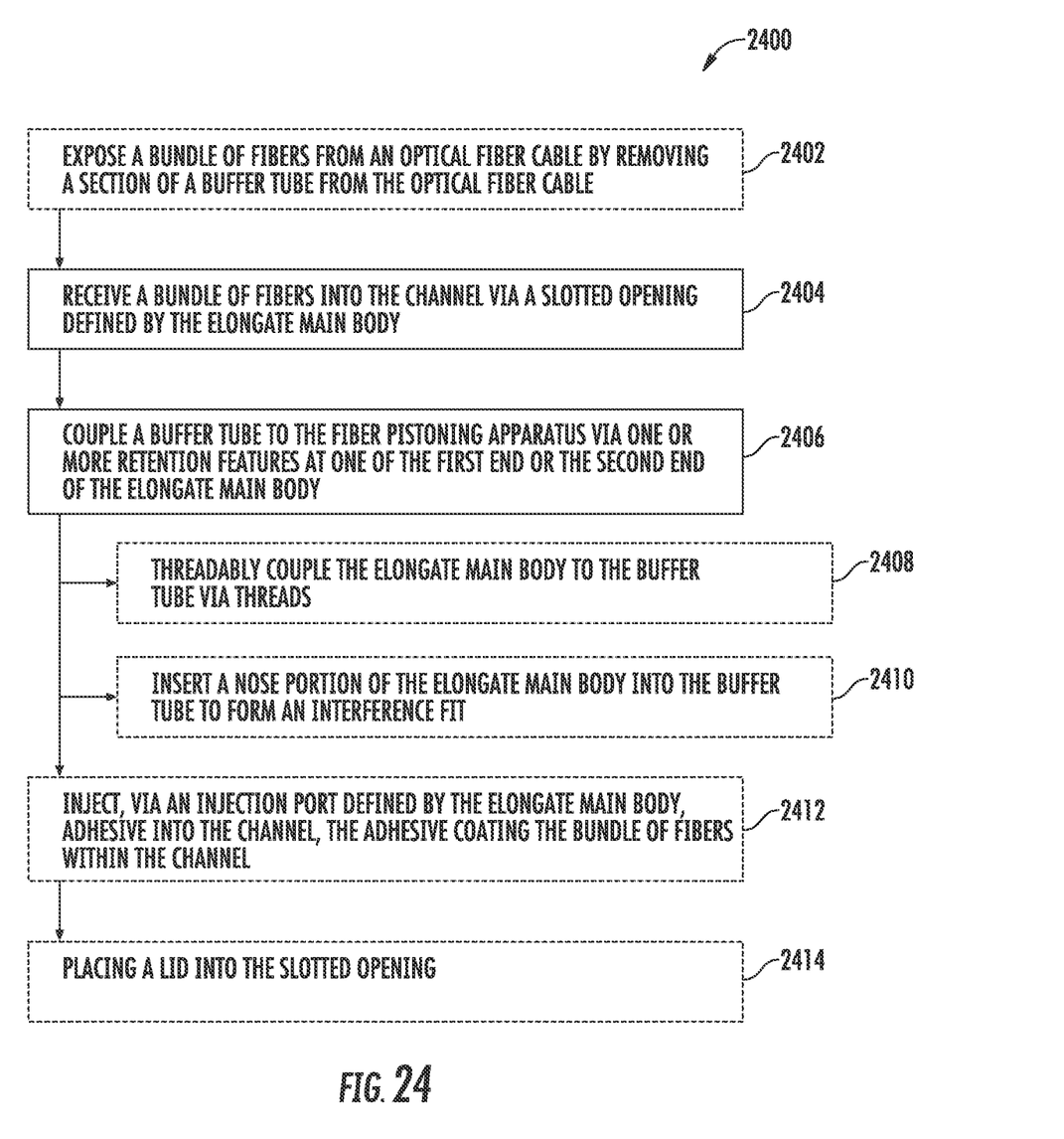
FIG. 24 illustrates a flow chart of a method of using a fiber anti-pistoning apparatus, in accordance with embodiments of the present disclosure.

Referring now to FIG. 24, a flow diagram of a method 2400 of using a fiber anti-pistoning apparatus is provided, in which the dashed boxes indicate optional steps of the method 2400. The fiber anti-pistoning apparatus may be configured in a similar manner as one or more of the exemplary fiber anti-pistoning apparatus 50 described above with reference to FIGS. 3 through 23. For example, the fiber anti-pistoning apparatus 50 may include an axial centerline 52 and an elongate main body 54 at least partially surrounding the axial centerline 52. The elongate main body 54 may define a channel 60 that extends from a first end 56 to a second end 58 of the fiber anti-pistoning apparatus.

As depicted, the method 2400 may begin with an optional step 2402 of exposing a bundle of fibers 106 from an fiber optic cable 100 by removing a section of buffer tube from the optical fiber cable 100. Removing a section buffer tube from the fiber optic cable 100 may directly expose the bundle of fibers 106 to the ambient environment (i.e. the atmosphere).

The method 2400 may further include a step 2404 of receiving the bundle of fibers 106 into the channel 60 via a slotted opening 68 defined by the elongate main body 54. As described above, the slotted opening 68 may extend from the first end 56 to the second end 58 of the elongate main body 54. Receiving the bundle of fibers 106 into the channel 60 may include inserting the bundle of fibers through the slotted opening 68 such that they are at least partially housed within the channel 60. Once the bundle of fibers 106 are received by the channel 60, they may not be entirely exposed to the ambient environment because they are at least partially housed within the channel 60 of the elongate main body 54.

In exemplary embodiments, the method 2400 may further include a step 2406 of coupling a buffer tube 102 to the fiber anti-pistoning apparatus 50 via one or more retention features 76, 77 at one of the first end 56 or the second end 58 of the elongate main body 54. For example, after the bundle of fibers 106 have been positioned within the channel 60 the buffer tube 102 may be moved axially into and/or onto the one or more retention features 76, 77, such that the bundle of fibers extend from within the buffer tube 102 to within the channel 60 of the fiber anti-pistoning apparatus 50.

In some embodiments, such as the embodiments illustrated in FIGS. 3 through 11, the one or more retention features 76, 77 may include threads defined on an interior surface 82 of the elongate main body 54. In such embodiments, the coupling step 2406 may further include an optional step 2408 of threadably coupling the elongate main body 54 of the fiber anti-pistoning apparatus 50 to the buffer tube 102 via the threads. In particular embodiments, such as the embodiment shown in FIGS. 10 and 11, the threads may be a first set of threads 80 defined at an inlet portion 78 and a second set of threads 81 defined at an outlet portion 79. In such embodiments, the buffer tube 102 may be a first buffer tube 102 of the fiber optic cable 100 that is threadably received (or coupled) to the inlet portion 78 by the first set of threads 80, and a second buffer tube 103 of the fiber optic cable 100 may be threadbly received (or coupled) to the outlet portion 79 by the second set of threads 81.

Additionally or alternatively, in other embodiments, such as the embodiments illustrated in FIGS. 12-18 and 21-23, the one or more retention features 76, 77 may include a nose portion 98 of the elongate main body 54. In such embodiments, the coupling step 2406 may further include an optional step 2410 of inserting the nose portion 98 of the elongate main body 54 into the buffer tube (such as the first buffer tube 102) to form an interference fit. For example, the nose portion 98 may be sized to be inserted into the buffer tube, such that an exterior of the nose portion 98 forms an interference fit (or friction fit) with the interior surface of the buffer tube. In many embodiments, as described above, the nose portion 98 may include one or more ribs (such as the ribs 110 and/or 112) to allow the nose portion 98 to grip the interior of the buffer tube.

As shown in FIG. 24, the method 2400 may further include an optional step 2410 of injecting, via an injection port 86 defined by the elongate main body 54, adhesive into the channel 60. The adhesive may coat the bundle of fibers 106 within the channel 60. The adhesive may advantageously provide additional protection and insulation to the bundle of fibers 106 housed within the channel 60. In exemplary embodiments, the adhesive may be a 1-part silicone adhesive or a 2-part silicone adhesive. In other embodiments, the adhesive may be any suitable adhesive that provides additional insulation to the bundle of fibers 106 housed within the channel 60 of the fiber anti-pistoning apparatus 50.

As shown, in embodiments such as those depicted in FIGS. 6-8 and 12-14, the method 2400 may further include an optional step 2414 of placing a lid 88 into the slotted opening 68. For example, the lid 88 may extend within the slotted opening 68 between the first end 56 and the second end 58 of the elongate main body 54. The lid may completely enclose the bundle of fibers 106 within the channel 60 in the circumferential direction C, thereby providing additional protection, insulation, and support to the bundle of fibers 106.

In many embodiments of the present fiber anti-pistoning apparatus, such as the one shown in FIGS. 15-18, the fiber anti-pistoning apparatus 50 may further include a grommet 114. In such embodiments, the method may include receiving the bundle of fibers 106 into an axial passage 118 defined through a grommet 114 via an axial slot 124 defined by the grommet 114. The bundle of fibers 106 may be positioned within the slot of the grommet 114, and the grommet 114 may then be subsequently coupled to the elongate main body 54. In such embodiments, the grommet 114 may be slidably received by a grommet opening 116 which corresponds to the shape of the grommet 114. In particular embodiments, the grommet 114 may be coupled to the elongate main body 54 such that the axial passage 118 aligns with the channel 60 (e.g. at least partially aligns with or entirely aligns with).

In further embodiments, such as but not limited to those shown in FIGS. 19 and 20, the method elongate main body 54 may be at least partially composed of a formable metal material (such as entirely composed of a formable metal material). In such embodiments, the method may further include deforming the formable metal material to form an interference fit between an interior surface of the elongate main body 54 and the buffer tube 102. As used herein, a formable metal material may be a metal that is capable of being plastically deformed by a user applied force. For example, in particular implementations, a bundle of fibers 106 may be received into the channel 60 through the slotted opening 68, and a portion of a first buffer tube 102 may be inserted into the channel 60. Subsequently, a user may apply a pinching force (or crimping force) to the exterior of the fiber anti-pistoning apparatus 50 to plastically deform the fiber anti-pistoning apparatus 50 and form an interference fit between the first buffer tube 102 and the fiber anti-pistoning apparatus 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber anti-pistoning apparatus comprising:
    an axial centerline;
    an elongate main body at least partially surrounding the axial centerline and extending from a first end to a second end of the elongate main body, the elongate main body defining a channel that extends along the axial centerline for housing a bundle of fibers, the channel extending between a first opening at the first end, a second opening at the second end, and a slotted opening between the first end and the second end for receiving the bundle of fibers, the elongate main body including one or more retention features for coupling to a first buffer tube wherein the one or more retention features includes a nose portion of the elongate main body, the nose portion sized to form an interference fit with an internal surface of the buffer tube.

2. The fiber anti-pistoning apparatus as in claim 1, further comprising a lid removably coupled to the elongate main body, the lid extending within the slotted opening between the first end and the second end of the elongate main body.

3. The fiber anti-pistoning apparatus as in claim 1, wherein the nose portion of the elongate main body includes one or more ribs circumferentially spaced apart from one another and extending radially outward from the nose portion.

4. The fiber anti-pistoning apparatus as in claim 1, wherein the nose portion of the elongate main body includes one or more ribs axially spaced apart from one another and extending radially outward from the nose portion.

5. The fiber anti-pistoning apparatus as in claim 1, further comprising a grommet defining an axial passage, the grommet coupled to the elongate main body between the first end and the second end of the elongate main body such that the axial passage aligns with the channel and forms a portion of the channel.

6. The fiber anti-pistoning apparatus as in claim 1, wherein the fiber anti-pistoning apparatus is at least partially composed of a formable metal material.

7. A method of using a fiber anti-pistoning apparatus, the fiber anti-pistoning apparatus comprising an axial centerline and an elongate main body at least partially surrounding the axial centerline, the elongate main body defining a channel that extends from a first end to a second end, the method comprising:
    receiving a bundle of fibers into the channel via a slotted opening defined by the elongate main body, the slotted opening extending from the first end to the second end of the elongate main body;
    coupling a buffer tube to the fiber anti-pistoning apparatus via one or more retention features at one of the first end or the second end of the elongate main body, the bundle of fibers extending from within the buffer tube to within the channel; and
    placing a lid into the slotted opening, the lid extending within the slotted opening between the first end and the second end of the elongate main body.

8. The method of claim 7, further comprising, exposing the bundle of fibers to be received by the channel from an optical fiber cable by removing a section of buffer tube from the optical fiber cable.

9. The method of claim 7, wherein the one or more retention features comprises threads defined on an interior surface of the elongate main body, and wherein the coupling step further comprises:
    threadably coupling the elongate main body to the buffer tube via the threads.

10. The method of claim 7, wherein the one or more retention features comprises a nose portion of the elongate main body, and wherein the coupling step further comprises:
    inserting the nose portion of the elongate main body into the buffer tube to form an interference fit.

11. The method of claim 7, further comprising injecting, via an injection port defined by the elongate main body, adhesive into the channel, the adhesive coating the bundle of fibers within the channel.

12. The method of claim 7, further comprising receiving the bundle of fibers into an axial passage defined through a grommet via an axial slot defined by the grommet.

13. The method of claim 12, further comprising further comprising coupling the grommet to the elongate main body such that the axial passage of the grommet aligns with the channel after receiving the bundle of fibers into the axial passage defined through the grommet.

14. The method of claim 7, wherein the elongate main body is at least partially composed of a formable metal material, and wherein the method further comprises:
    deforming the formable metal material to form an interference fit between an interior surface of the elongate main body and the buffer tube.

15. A fiber anti-pistoning apparatus comprising:
    an axial centerline;
    an elongate main body at least partially surrounding the axial centerline and extending from a first end to a second end of the elongate main body, the elongate main body defining a channel that extends along the axial centerline for housing a bundle of fibers, the channel extending between a first opening at the first end, a second opening at the second end, and a slotted opening between the first end and the second end for receiving the bundle of fibers, the elongate main body including one or more retention features for coupling to a first buffer tube, wherein the one or more retention features includes a first set of threads defined on an interior surface of the elongate main body at an inlet portion of the fiber anti-pistoning apparatus for coupling to a first buffer tube.

16. The fiber anti-pistoning apparatus as in claim 15, further comprising an injection port defined by the main body between the first end and the second end.

17. The fiber anti-pistoning apparatus as in claim 15, wherein the one or more retention features includes a second set of threads defined on an interior surface of the elongate main body at an outlet portion of the fiber anti-pistoning apparatus for coupling to a second buffer tube.

* * * * *